United States Patent
Maciukenas

(10) Patent No.: US 7,047,383 B2
(45) Date of Patent: May 16, 2006

(54) BYTE SWAP OPERATION FOR A 64 BIT OPERAND

(75) Inventor: Thomas B. Maciukenas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 134 days.

(21) Appl. No.: 10/194,598

(22) Filed: Jul. 11, 2002

(65) Prior Publication Data

US 2004/0010676 A1 Jan. 15, 2004

(51) Int. Cl.
*G06F 12/00* (2006.01)

(52) U.S. Cl. .................... 711/165; 712/300
(58) Field of Classification Search ............. 712/300
See application file for complete search history.

(56) References Cited

U.S. PATENT DOCUMENTS

| | | | |
|---|---|---|---|
| 3,711,692 A | 1/1973 | Batcher | |
| 3,723,715 A | 3/1973 | Chen et al. | |
| 4,139,899 A | 2/1979 | Tulpule et al. | |
| 4,161,784 A | 7/1979 | Cushing et al. | |
| 4,393,468 A | 7/1983 | New | |
| 4,418,383 A | 11/1983 | Doyle et al. | |
| 4,498,177 A | 2/1985 | Larson | |
| 4,707,800 A | 11/1987 | Montrone et al. | |
| 4,771,379 A | 9/1988 | Ando et al. | |
| 4,903,228 A | 2/1990 | Gregoire et al. | |
| 4,989,168 A | 1/1991 | Kuroda et al. | |
| 5,081,698 A | 1/1992 | Kohn | |
| 5,095,457 A | 3/1992 | Jeong | |
| 5,168,571 A | 12/1992 | Hoover et al. | |
| 5,187,679 A | 2/1993 | Vassiliadis et al. | |
| 5,268,995 A | 12/1993 | Diefendorff et al. | |
| 5,390,135 A | 2/1995 | Lee et al. | |
| 5,392,437 A | 2/1995 | Matter et al. | |
| 5,408,670 A | 4/1995 | Davies | |
| 5,423,010 A | 6/1995 | Mizukami | |
| 5,426,783 A | 6/1995 | Norrie et al. | |
| 5,465,374 A | 11/1995 | Dinkjian et al. | |
| 5,487,159 A | 1/1996 | Byers et al. | |
| 5,579,253 A | 11/1996 | Lee et al. | |
| 5,594,437 A | 1/1997 | O'Malley | |
| 5,594,919 A * | 1/1997 | Turkowski | 712/300 |
| 5,625,374 A | 4/1997 | Turkowski | |

(Continued)

FOREIGN PATENT DOCUMENTS

WO    WO 97/07450 A1    2/1997

(Continued)

OTHER PUBLICATIONS

Hansen, "MicroUnity's MediaProcessor Architecture", IEEE Micro, 1996, p. 34-41.*

(Continued)

*Primary Examiner*—Mano Padmanabhan
*Assistant Examiner*—Paul Baker
(74) *Attorney, Agent, or Firm*—Blakley, Sokoloff, Taylor & Zafman LLP

(57) ABSTRACT

A method for a byte swap operation on a 64 bit operand. The method of one embodiment comprises accessing an operand stored in a register. The operand is comprised of a plurality of bytes of data. A first set of bytes located in an upper half of said register is reordered. A second set of bytes located in a lower half of said register is reordered. The first set of bytes is swapped with the second set of bytes, wherein the first set of bytes is relocated to the lower half of the register and the second set of bytes is relocated to the upper half of the register.

31 Claims, 6 Drawing Sheets

U.S. PATENT DOCUMENTS

| | | | |
|---|---|---|---|
| 5,680,161 | A | 10/1997 | Lehman et al. |
| 5,819,117 | A * | 10/1998 | Hansen ........................ 712/300 |
| 5,909,572 | A | 6/1999 | Thayer et al. |
| 6,041,404 | A | 3/2000 | Roussel et al. |
| 6,115,812 | A | 9/2000 | Abdallah et al. |
| 6,221,740 | B1 | 4/2001 | Dai et al. |
| 6,243,808 | B1 | 6/2001 | Wang |
| 6,728,874 | B1 * | 4/2004 | Sijstermans et al. ........ 712/300 |

FOREIGN PATENT DOCUMENTS

| | | |
|---|---|---|
| WO | WO 97/09671 A1 | 3/1997 |
| WO | WO 97/32278 A1 | 9/1997 |

OTHER PUBLICATIONS

Handy, "The Cache Memory Book", 1998, Acedemic Press, 2$^{nd}$ ed, p. 1-5,27-28.*

Microsoft Press, "Computer Dictionary", 1997, 3$^{rd}$ ed., p. 402.*

Abbott, et al., "Broadband Algorithms with the MicroUnity Mediaprocessor," MicroUnity Systems Engineering, Inc., Proceedings of Compcon, IEEE, 1996, pp. 349-354.

Advanced Micro Devices, Inc., "AMD-3D Technology Manual," Feb., 1998, pp. 1-58.

Austrian Search Report, Appln. No. 9901342-7, Oct. 31, 2000, 7 pages.

Case, B., "Philips Hopes to Displace DSPs with VLIW, TriMedia Processors Aimed at Future Multimedia Embedded Apps," Microprocessor Report, Dec. 1994, pp. 12-18.

Diefendorff, K., et al., "AltiVec Extension to PowerPC Accelerates Media Processing," IEEE, #0272-1732/00, 2000, pp. 85-95.

Errata to MC88110Second Generation RISC Microprocessor User's Manual, Motorola, Inc., 1992, pp. 1-11.

European Search Report, EP 99 30 2378, Mar. 14, 2000, 3 pages.

Gwennap, L., "New PA-RISC Processor Decodes MPEG Video, H s PA-7100LC Uses New Instructions to Eliminate Decoder Chip," Microprocessor Report, Jan. 1994, pp. 16-17.

Hansen, C., "Architecture of a Broadband Mediaprocessor," Proceedings of Compcon, IEEE, 1996, pp. 334-340.

Hayes, et al., "MicroUnity Software Development Environment," MicroUnity Systems Engineering, Inc., Proceedings of Compcon, IEEE, 1996, pp. 341-348.

Hewlet Packard, "64-bit and Multimedia Extensions in the PA-RISC 2.0 Architecture," Microprocessors Precision Architecture, 1997, 18 pages.

i860 TM. Microprocessor Family Programmer's Reference Manual, Intel Corporation, 1992, Chapters 1, 3, 8, and 12.

Intel Corporation, "Intel Architecture Software Developer's Manual, vol. 2; Instruction Set Reference," 1999, 26 pgs.

Intel Corporation, "Willamette Processor Developer's Guide," Manual, Feb. 2000, 16 pages.

Intel i750, i860 TM, i960 Processors and Related Products, 1993, pp. 1-3.

Intel Corporation, "IA-32 Intel® Architecture Software Developer's Manual, vol. I: Basic Architecture," 2002, 21 pgs. total.

Intel Corporation, "IA-32 Intel® Architecture Software Developer's Manual, vol. II: Instruction Set Reference," 2002, 19 pgs. total.

Intel Corporation, "Intel® Itanium ™ Architecture Software Developer's Manual, vol. 3: Instruction Set Reference," Rev. 2.0, Dec. 2001, 30 pgs. total.

Intel Corporation, "Intel486™ Microprocessor Family Programmer's Reference Manual," 1992, 44 pgs. total.

Intel Corporation, "Pentium® Processor Family Developer's Manual, vol. 3: Architecture and Programming Manual," 1995, 54 pgs. total.

Intel Corporation, Pentium Processor's User's Manual, vol. 3: Architecture and Programming Manual, 1993, Index and Chapters 1, 3, 4, 6, 8, 18, and partial chapter 25.

Kawakami, Y., et al., "A Single-Chip Digital Signal Processor for Voiceband Applications," IEEE, 1980 International Solid-State Circuits Conference, pp. 40-41.

Lee, R.B., "Accelerating Multimedia with Enhanced Microprocessors," IEEE Micro, Apr. 1995, pp. 22-32.

Levinthal, et al., "Chap—A SIMD Graphics Processor," Computer Graphics Project, ACM, vol. 18, No. 3, Jul. 1984, pp. 77-81.

Levinthal, et al., "Parallel Computers for Graphics Applications," Proceedings: Second Int'l. Conf. on Architectural Support for Programming Languages and Operating Systems, (ASPLOS II), IEEE, 1987, pp. 193-198.

Margulis, N., "i860 Microprocessor Architecture," McGraw Hill, Inc., 1990, Chapters 6,7,8,10, and 11.

MC88110 Programmer's Reference Guide, Motorola, Inc., 1992, pp. 1-4.

MC88110 Second Generation-RISC Microprocessor User's Manual, Motorola, Inc., Sep. 1992, pp. 2-1 through 2-22, 3-1 through 3-32, 5-1 through 5-25, 10-62 through 10-71, Index 1 through 17.

MIPS, "MIPS Digital Media Extension," *Set Architecture Specification*, http:/ /www.mips.com/MDMXspec.ps (Oct. 21, 1997), 8 pages.

Motorola MC88110 Second Generation RISC Microprocessor User's Manual, Motorola, Inc., 1991.

Shipnes, J., "Graphics Processing with the 88110 RISC Microprocessor," Motorola, Inc., IEEE, No. 0-8186-26455-0/92, 1992, pp. 169-174.

Silicon Graphics, "Silicon Graphics Introduces Compact MIPS® RISC Microprocessor Code for High Performance at a Low Cost," Oct. 21, 1996, 13 pages.

Sun Microsystems, ULTRASPARC™ The Visual Instruction Set (VIS™): On Chip Support for New-Media Processing, Whitepaper 95-022, 1996, 7 pages.

Sun Microsystems, Inc., "Visual Instruction Set (VIS™) User's Guide," Version 1.1, Mar. 1997, pp. i-vii & 1-136.

TMS320c2X, User's Guide, Digital Signal Processing Products, Texas Instruments, 1993, pp. 3-2-3-11;3-28-3-34;4-1-4-22;4-41;4-103;4-119;4-120;4-122;4-150;4-151.

Tri Media, "TM 1000 Preliminary Data Book," Phillips Electronics North America Corporation, 1997, 30 pages.

UltraSPARC Multimedia Capabilities On-Chip Support for Real0-Time Video and Advanced Graphics;SPARC Technology Business, Sep. 1994, Sun Microsystems, Inc.

Wang et al., "A Processor Architecture for 3D Graphics Calculations," Computer Motion, Inc., Goleta CA, 23 pgs.

* cited by examiner

BYTE SWAP OPERATION FOR A 64 BIT OPERAND

FIELD OF THE INVENTION

The present invention relates generally to the field of microprocessors and computer systems. More particularly, the present invention relates to a method and apparatus for a byte swap operation for a 64 bit operand.

BACKGROUND OF THE INVENTION

Computer systems have become increasingly pervasive in our society. The processing capabilities of computers have increased the efficiency and productivity of workers in a wide spectrum of professions. As the costs of purchasing and owning a computer continues to drop, more and more consumers have been able to take advantage of newer and faster machines. Furthermore, many people enjoy the use of notebook computers because of the freedom. Mobile computers allow users to easily transport their data and work with them as they leave the office or travel. This scenario is quite familiar with marketing staff, corporate executives, and even students.

Given that most of these computers are connected to local area networks (LANs) or the Internet at one point or another, data is transferred and exchanged among these machines. However, not all computers are created equal. For instance, each type of computer can have a different internal architecture or run on a different operating system. Thus, not all of these computer platforms may be compatible. One such issue can arise from the format in which an architecture handles data. Similarly, these computers may not all be designed to process data the same way.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

Figure 1:
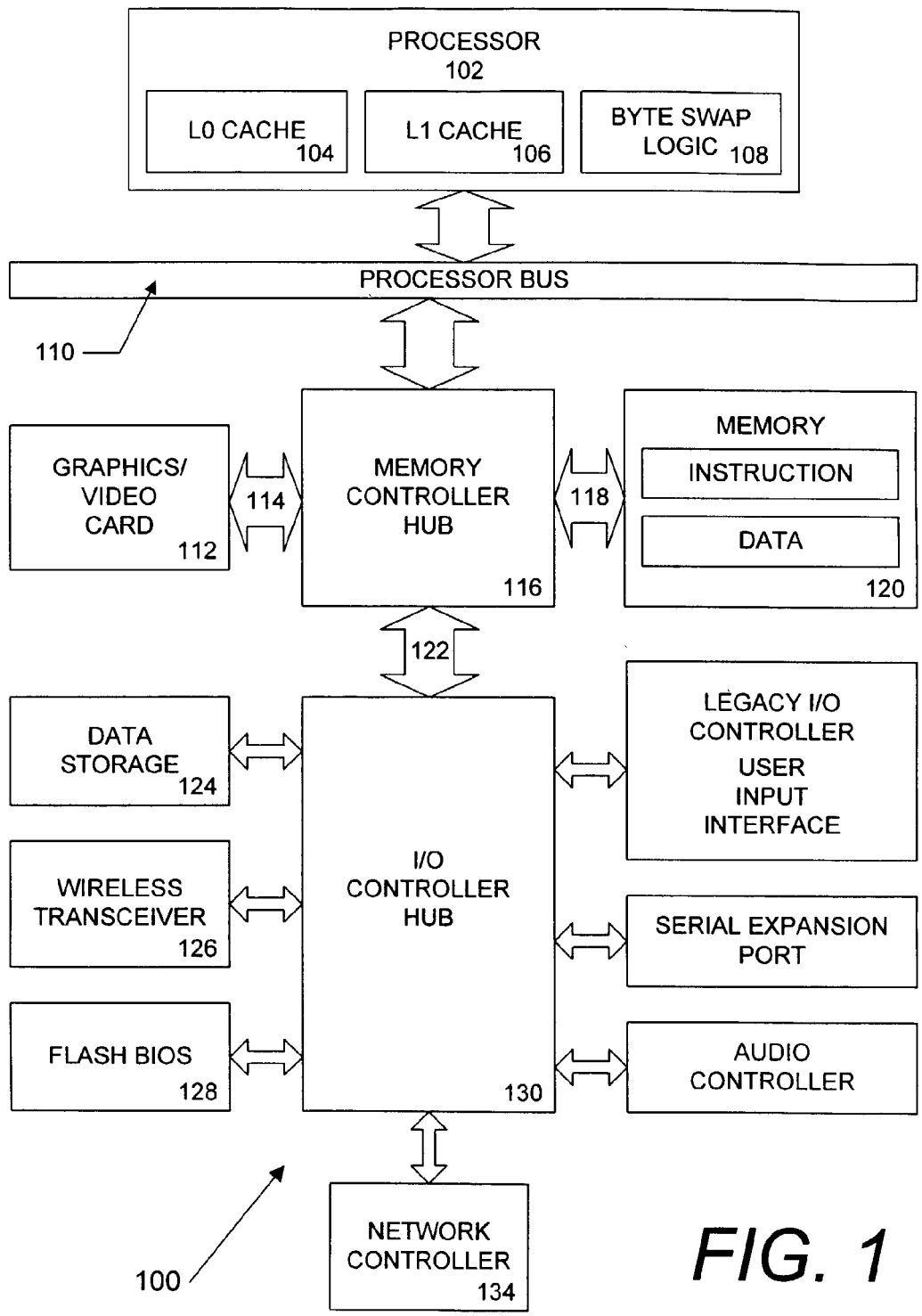
FIG. 1 is a block diagram of a computer system formed with a processor that includes a mechanism for byte swap operations in accordance with one embodiment of the present invention.

A method and apparatus for a byte swap operation for a 64 bit operand is disclosed. The embodiments described herein are described in the context of a microprocessor, but are not so limited. Although the following embodiments are described with reference to a processor, other embodiments are applicable to other types of integrated circuits and logic devices. The same techniques and teachings of the present invention can easily be applied to other types of circuits or semiconductor devices that can benefit from higher pipeline throughput and improved performance. The teachings of the present invention are applicable to any processor or machine that performs data manipulation. However, the present invention is not limited to processors or machines that perform 64 bit or 32 bit data operations and can be applied to any processor and machine in which data swapping is needed.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention.

Data transfers like FTP between computers having different architectures can involve a bit of manipulation. One characteristic of computer architectures concern which bytes are most significant in multi-byte data types. In big-endian architectures, the leftmost bytes (those with a lower address) are most significant. In little-endian architectures, the rightmost bytes are most significant. Many mainframe computers, such as IBM mainframes, use a big-endian architectures. Most modern computers, including PCs, use the little-endian system. The Power PC system is bi-endian because it can understand both systems. Converting data between the two systems is sometimes referred to as the NUXI problem. The bit ordering within each byte can also be big-endian or little-endian. Some architectures even use big-endian ordering for bits and little-endian ordering for bytes, or vice versa. Thus the sending of data from a little-endian computer to a big-endian computer can require the flipping around of all the data so that the data is correctly interpreted.

Embodiments of the present invention provide a way to reorganize the order of data elements through a byte swap operation. A byte swap macro instruction can be used to reverse the order of all the bytes in a register. One reorganization that can be achieved is the movement of eight bytes of data from their original positions and flipping the order of the bytes around. Thus a byte swap operation can be used to converting ABCDEFGH to HGFEDCBA, wherein each letter represents a byte of data. One embodiment of the present invention first performs a 64 bit "partial byte swap" on the source data. This reverses both halves of the data in a register so that '01 23 45 67-89 AB CD EF' become '67 45 23 01-EF CD AB 89', wherein each character comprises of four bits and each pair of numbers/letters represent a single byte of data. Then a 64 bit rotate left by 32 bits is performed on the swapped data. This has the effect of exchanging the upper and lower halves of the register contents so that '67 45 23 01-EF CD AB 89' above becomes 'EF CD AB 89-67 45 23 01'.

Generally, the movement of data in logic and circuitry in a processor entails numerous wires going back and forth. In the movement of a large number of bits such as with a 64 bit operand, the data may have to be fed through the logic hardware more than once. For example, such a situation would exist where a 32 bit processor attempts to manipulate a 64 bit wide piece of data. Although this example describes a 32 bit processor, certain portions of such a processor may be able to handle more than 32 bits of data. The phase "32 bit processor" generally refers to a processor that cannot process an entire 64 bit wide operand in its execution units at a time. The 64 bit data would have to be routed through the 32 bit processor twice in order to perform an operation on the entire 64 bit piece.

In the case of a byte swap as described above, the 32 bit processor would have to operate on four bytes at a time and then merge the pieces together during later passes. Furthermore, a 32 bit processor would not have the 64 bit wide hardware such as registers to handle the entire 64 bit piece. The 64 bit data needs to be shifted around and aligned in other passes so that the 32 bit processor can operate correctly. Temporary registers are needed to store the various pieces of the 64 bit data while the processor is working on it. The additional circuitry and routing to handle these extra passes through the execution unit of a processor can become costly in terms of execution time, power consumption, and die area. Additional microcode is also necessary to perform the operations on the 64 bit data in such a processor. Each time something is sent through the execution unit, one micro operation (uop) is performed with the microcode. But not all uops are the same. Some uops are slower and require more time to complete. Thus slow uops can impact the throughput of the processor pipeline and overall processor performance. By making the number of passes through the executions units fewer, less uops are needed to achieve the same result. In addition to optimizing the number of uops, how fast the operation is processed can be improved by using faster uops. Improvements that reduce or speed up an algorithm like that for a byte swapping operation can reduce power consumption.

Referring now to FIG. 1, an exemplary computer system 100 is shown. System 100 includes a component, such as a processor 102 to employ a byte swap operation for a 64 bit operand in accordance with the present invention, such as in the embodiment described herein. System 100 is representative of processing systems based on the PENTIUM® III, PENTIUM® 4, Itanium™, and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, the present invention is not limited to any specific combination of hardware circuitry and software.

The present enhancement is not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that performs byte swap operations on operands. Furthermore, some architectures have been implemented to enable instructions to operate on several data simultaneously to improve the efficiency of multimedia applications. As the type and volume of data increases, computers and their processors have to be enhanced to manipulate data in more efficient methods.

FIG. 1 is a block diagram of a computer system 100 formed with a processor 102 that includes byte swap logic 108 in accordance with the present invention. The present embodiment is described in the context of a single processor desktop or server system, but alternative embodiments can be included in a multiprocessor system. System 100 is an example of a hub architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 0 (L0) internal cache memory 104 and a Level 1 (L1) internal cache memory 106. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. A byte swap mechanism 108 also resides in the processor 102. For one embodiment, the byte swap algorithm is embedded within the microcode of the processor 102. Alternate embodiments of a byte swap logic 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For the embodiment of a computing system 100 in FIG. 1, a wireless transceiver 126 is also coupled to the ICH 130. The wireless transceiver is capable of receiving and transmitting data from the system 100 through the ICH 130 as well as using wireless signals to receive and transmit data from remote systems. Control of the transceiver 126 resides with device driver software and memory 120, which communicates with firmware software and memory residing on the wireless transceiver 126. The processor 102 can execute instructions from memory 120 that cause the processor to send data to and request from the wireless transceiver. Application software and the operating system, working through the wireless transceiver device driver, can interface the wireless transceiver 126. The wireless transceiver enables the system 100 to communicate with other computers and devices that have wireless capability.

For another embodiment of a system, a byte swap mechanism can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 2:
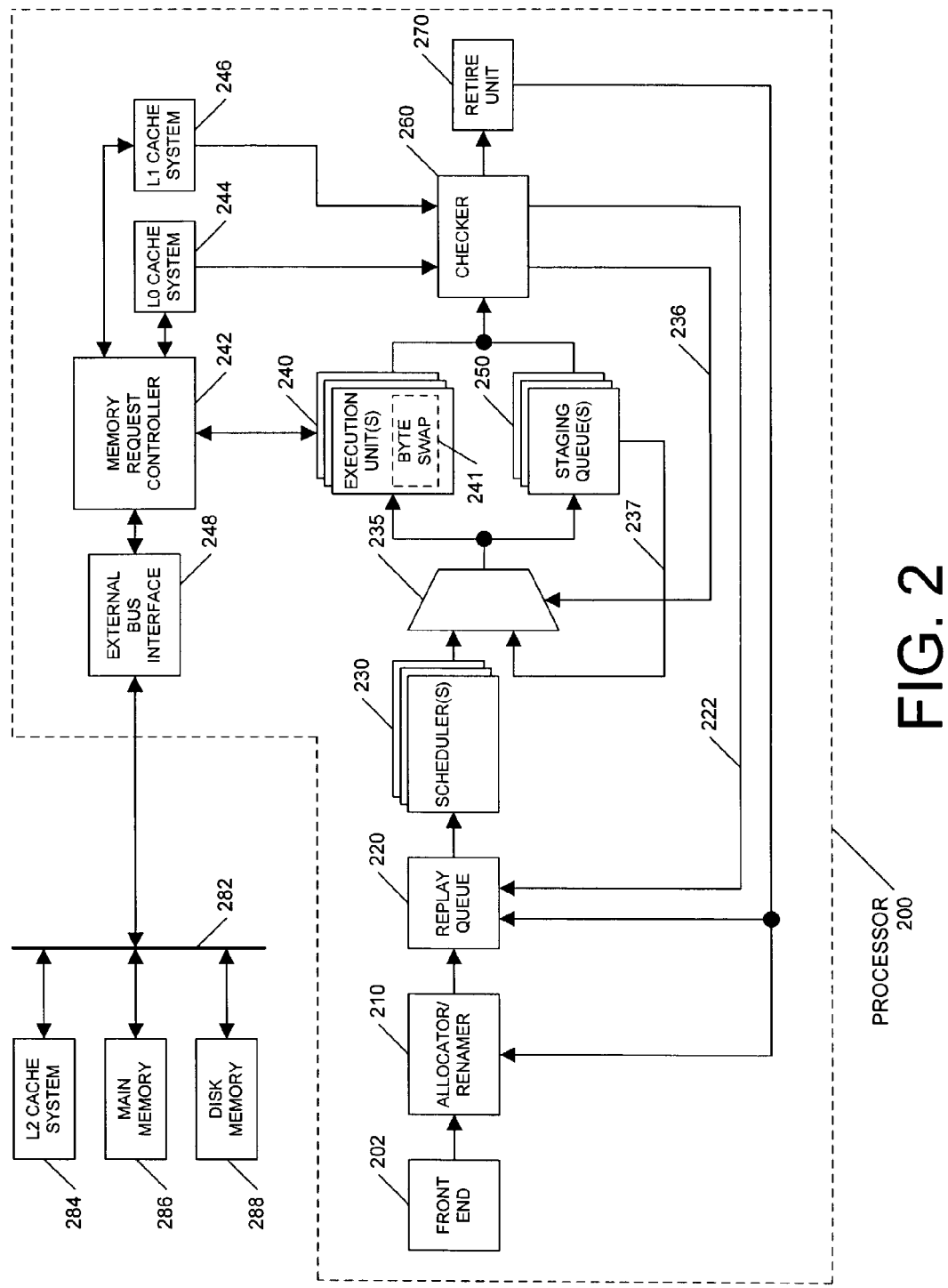
FIG. 2 is a block diagram of a processor that includes an embodiment of the present invention.

FIG. 2 is a block diagram of a processor 200 that includes an embodiment of a byte swap mechanism 241 in accordance the present invention. The front end 202 of the processing phase is coupled to schedulers 230 via allocator/renamer 210 and a rescheduler replay queue 220. Instructions can be dispatched speculatively from the schedulers 230. Thus the schedulers 230 can dispatch an instruction without first determining whether data needed by the instruction is valid or available. Schedulers 230 are to dispatch instructions from the front end 202 when the input data needed to execute the instructions is projected to be ready when the instruction would reach execution.

Processor 200 further includes a replay mechanism implemented via a checker 260, staging queues 250, and replay multiplexor 235. In addition replays can be done from the replay queue 220 when the checker 260 elects to do so. The replay system can replay instructions that were not executed correctly after they were scheduled by the schedulers 230. The execution units 240 can perform data speculation in executing an instruction. Execution units 240 can be an arithmetic logic unit (ALU), a floating point ALU, a memory unit, etc. The execution units 240 can also be collectively referred to as an execution cluster. Logic to perform byte swap operations for 64 bit operands is also located in the execution units 240. One execution unit 240 of this embodiment includes logic 241 to perform byte swap operations on 64 bit operands in accordance with the present invention. A register file in the execution units 240 can store operands and other data for use during instruction execution and processing. Although the example of FIG. 2 shows one execution unit 240 and one staging queue 250 in order to simplify the description, multiple execution units 240 and staging queues 250 can be coupled to multiple schedulers 230. Execution units 240 may be coupled to multiple levels of memory devices from which data may be retrieved and to which data may be stored. In one embodiment, execution units 240 are coupled to L0 cache 244, L1 cache 246, and external memory devices 284, 286, 288, via memory request controller 242.

If data requested is not found in L0 cache 244 or L1 cache 246, execution units 240 may attempt to retrieve the needed data from additional levels of memory. Such requests may be made through memory request controller 242. An external bus interface 248 is coupled to memory request controller 242 and external bus 282. In one embodiment, external memory devices may includes L2 cache 284, main memory 286, disk memory 288, and other storage devices which may be coupled to external bus 282. Access to external memory devices is much slower than access to the on-die cache memory. When attempting to load data to a register from memory, execution unit 240 attempts to load the data from each of the memory devices from fastest to slowest. In one embodiment, the fastest level of memory devices, L0 cache 244, is checked first, followed by L1 cache 246, L2 cache 284, main memory 286, and disk memory 288. The time to load memory increases as each additional memory level is accessed. When the needed data is eventually found, the data retrieved by execution units 240 can be stored in the fastest available memory device for future access.

The term "registers" is used herein to refer to the on-board processor storage locations that are used as part of macro-instructions to identify operands. In other words, the registers referred to herein are those that are visible from the outside of the processor (from a programmer's perspective). However, the registers described herein can be implemented by circuitry within a processor using any number of different techniques, such as dedicated physical registers, dynamically allocated physical registers using register renaming, combinations of dedicated and dynamically allocated physical registers, etc.

In this embodiment, staging queue 250 can delay instructions for a fixed number of clock cycles so that the report on problems in executing the instruction in the execution units 240 and the instruction may enter the checker 260 at the same moment in time. In various embodiments, the number of stages in staging queue 250 varies based on the amount of staging or delay desired in each execution channel. A copy of a dispatched instruction may be staged through staging queue 250 in parallel to being executed through execution units 240. In this manner, a copy of the instruction maintained in staging queues 250 is provided to checker 260. This copy of the instruction can be routed back to replay multiplexor 235 by checker 260 for re-execution if the instruction did not execute successfully.

In this architecture, a checker unit 260 is positioned after the execution core 240. The checker 260 can analyze the data dependency of the instruction and whether any error exists. Furthermore, the checker 260 also checks the condition of the result of the execution to determine whether replay is necessary. If an instruction has executed successfully, the checker 260 marks the instruction as completed and declares the instruction "replay safe". "Replay safe" instructions are forwarded to retire unit 270. For another embodiment, multiple checkers (a fast or early checker and a slow or late checker) can be used, and permit the detection of incorrect instruction execution at different points in the pipeline. Similarly, another embodiment can have multiple replay paths. Other conditions can also generate replays. The performance of the processor 200 can improve if instructions are replayed more quickly. The checker 260 is coupled to the retirement unit 270. The schedulers 230 and execution units 240 assume that everything is okay. The checker 260 and retirement unit 270 check for problems. After the execution, the micro-ops and results are temporarily stored to await commitment to architectural state. If there are no execution problems, the instructions are retired and the results committed to the architectural state.

Figure 3:
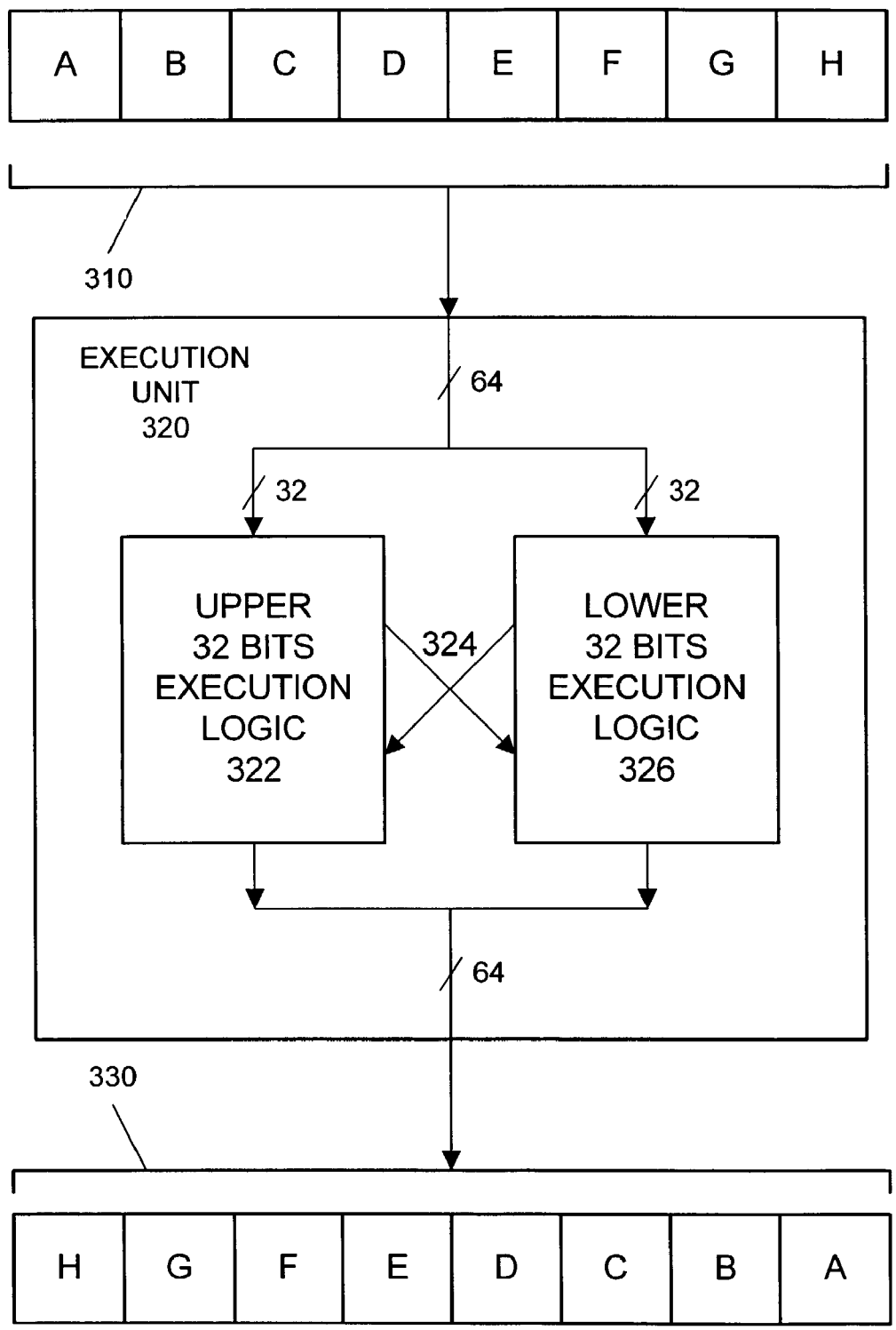
FIG. 3 is a block diagram of a byte swap operation on a 64 bit operand in accordance with the present invention.

FIG. 3 is a block diagram of a byte swap operation on a 64 bit operand in accordance with the present invention. The initial 64 bit operand 310 in this example comprises of eight data segments: A, B, C, D, E, F, G, and H. The data segments here are of equal length and each comprise of 8 bits or a byte of data. For one embodiment, the operand 310 can reside either in a register or a memory location or a register file. The initial 64 bit operand 310 is sent to an execution unit 320 in the processor along with a byte swap instruction. By the time the byte swap instruction reaches the execution unit 320, the instruction should have been decoded earlier in the processor pipeline. Thus, the byte swap instruction can be in the form of a micro operation (uop) or some other decoded format. Internally to the execution unit 320, the 64 bit operand 310 is separated into two pieces of 32 bits wide each. Each 32 bit portion is bussed to a 32 bit execution logic block. The logic blocks 322, 326, can operate as two relatively independent 32 bit halves. In this embodiment, the upper 32 bit portion comprises of data segments A, B, C, and D, which are sent to the upper 32 bits logic block 322. Similarly, the lower 32 bit portion comprises of data segments E, F, G, and H, which are sent to the lower 32 bits logic block 326.

As shown in FIG. 3, the two logic blocks 322, 326, are capable of communicating and exchanging data with each other via internal routing connections 324. The 32 bit execution logic block of this embodiment are arithmetic logic units (ALUs), but are not limited as such. Other types of logic circuits can also be implemented. Within each 32 bit logic block 322, 326, the respective 32 bit portion of the 64 bit operand 310 is manipulated. For this embodiment, the logic blocks 322, 326, first shift the data segments in its respective 32 bit portion. For example, the upper portion of A, B, C, and D are shifted to become D, C, B, and A. Likewise, the lower portion of E, F, G, and H, are shifted to become H, G, F, and E. Then the shifted data segments are swapped between the logic blocks 322, 326, and outputted from the execution unit 320 as a 64 bit piece of data. The exact order of the shifting and swapping can vary in other embodiments and implementations. The performing of a 64 bit byte swap operation has virtually no impact on the speed of the hardware versus a 32 bit byte swap operation because the upper and lower halves of the operation are independent. The two independent 32 bit byte swaps happen in parallel and take the same time as doing a single 32 bit byte swap. The two logic blocks 322, 326, of this embodiment are also designed such that an instruction can cause the execution unit 320 to conduct a 32 bit operation on a single 32 bit portion. For instance, a lower byte swap instruction can activate the lower 32 bit execution logic 326 to only modify the lower 32 bits of an operand, wherein the upper portion of the 64 bit operand is unaffected. Similarly, a upper byte swap instruction can cause the upper 32 bit execution logic 322 to perform an operation on the upper 32 bits of an operand. The present example describes the two byte swaps as happening in parallel, but in an another implementation, the byte swaps can occur in serially in time but with two separate execution logic blocks 322, 326.

Although the logic blocks 322, 326, of this embodiment are shown as blocks containing logic circuitry and can be identical in structure, other embodiments of the present invention are not limited as such. The logic blocks 322, 326, can each contain different logic to manipulate and process data in various ways. For instance, the lower 32 bits logic block 326 can be capable of performing operations not available in the upper 32 bits logic block 322, and vice versa. Similarly, one logic block can be optimized to handle fast uops while the other is optimized to handle slow uops. Furthermore, alternative embodiments of the execution unit 320 in accordance to the present invention can include a 64 bit logic block or ALU wherein the entire 64 bit operand 310 is processed internally and the 32 bit separation is not visible.

The eight data segments of the original 64 bit operand 310 were ordered as A, B, C, D, E, F, G, and H. On the other hand, the resultant 64 bit operand 330 comprises of the original eight data segments in reverse order: H, G, F, E, D, C, B, and A. Although the operands of these examples comprise of 64 bit long operands, other embodiments of the present invention can be implemented with operands of alternative lengths such as 32, 128, and 256. Similarly, these operands are not restricted to having eight data segments. The data segments are described of 8 bit bytes. Alternative embodiments of byte swapping instructions can have various data segment types and sizes depending on the particular architecture and instruction set. For example, the 64 bit operand may be composed of four 16 bit data segments or words instead. The term byte can be defined as having any number of bits depending on the particular processor architecture. Thus the execution unit of another embodiment may operate on word boundaries instead of byte boundaries. In other embodiment, a 128 bit operand may have data segments of 32 bits or double word length swapped.

Figure 4A:
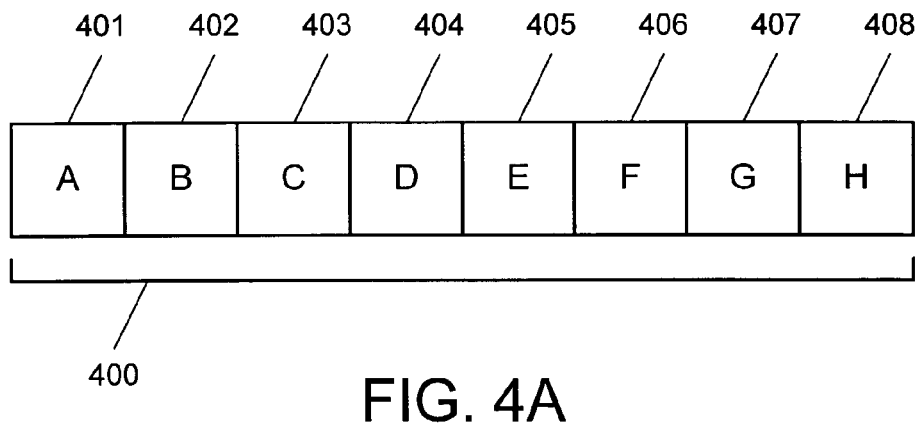
FIGS. 4A, 4B, 4C, and 4D illustrate the operation of a byte swap instruction in accordance with one embodiment of the present invention.

FIGS. 4A, 4B, 4C, and 4D illustrate the operation of a byte swap instruction in accordance with one embodiment of the present invention. In FIG. 4A, a operand 400 comprised of eight data segments (A 401, B 402, C 403, D 404, E 405, F 406, G 407, H 408) is presented for byte swapping. As described above, the data segments of this example are also comprised of 8 bit wide bytes, making the operand 400 64 bits wide. Other embodiments can have different sized bytes and operands. The operand 400 is accompanied with a byte swap instruction and sent through a processor execution pipeline for processing.

Figure 4B:
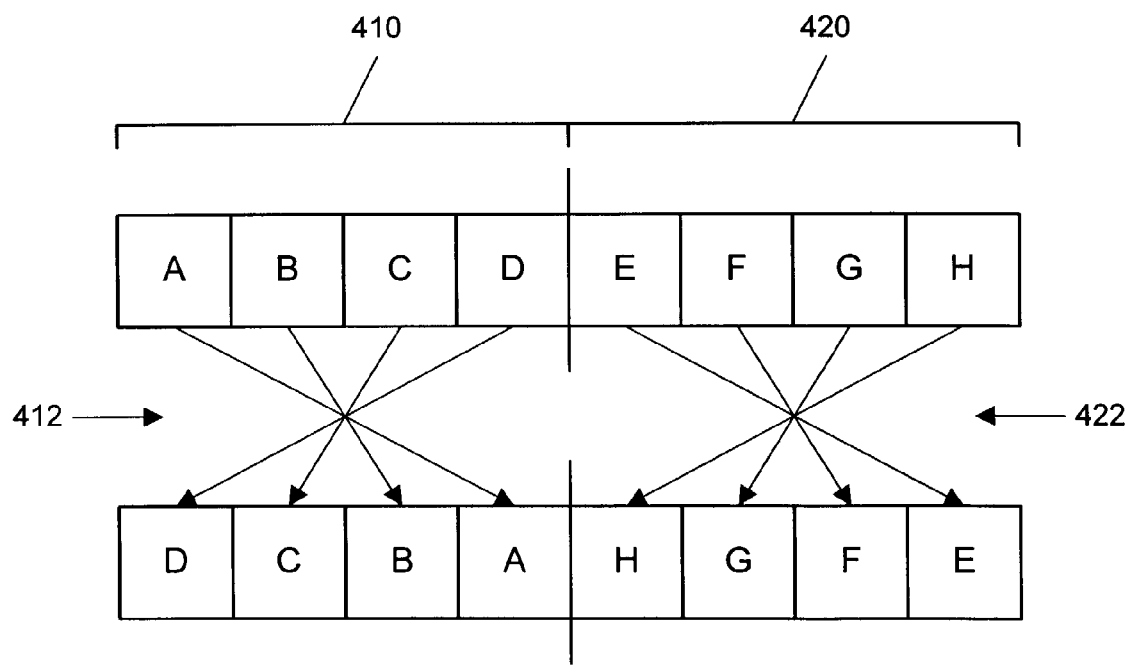

FIG. 4B illustrates a first portion of the byte swapping operation on the operand 400. The execution unit of this embodiment treats the operand 400 as two individual 32 bit wide segments 410, 420. Each 32 bit wide segments 410, 420, comprises of four bytes. A byte rotation or swap 412 is performed on bytes A, B, C, and D in the first 32 bit segment to obtain a byte ordering of D, C, B, and A. A similar byte rotation or swap 422 is conducted on bytes E, F, G, and H in the second 32 bit segment to obtain a byte ordering of H, G, F, and E. For one embodiment, a single byte swap microinstruction can cause both the upper and lower byte swaps to occur even though the two 32 bit halves appear to be separate.

Figure 4C:
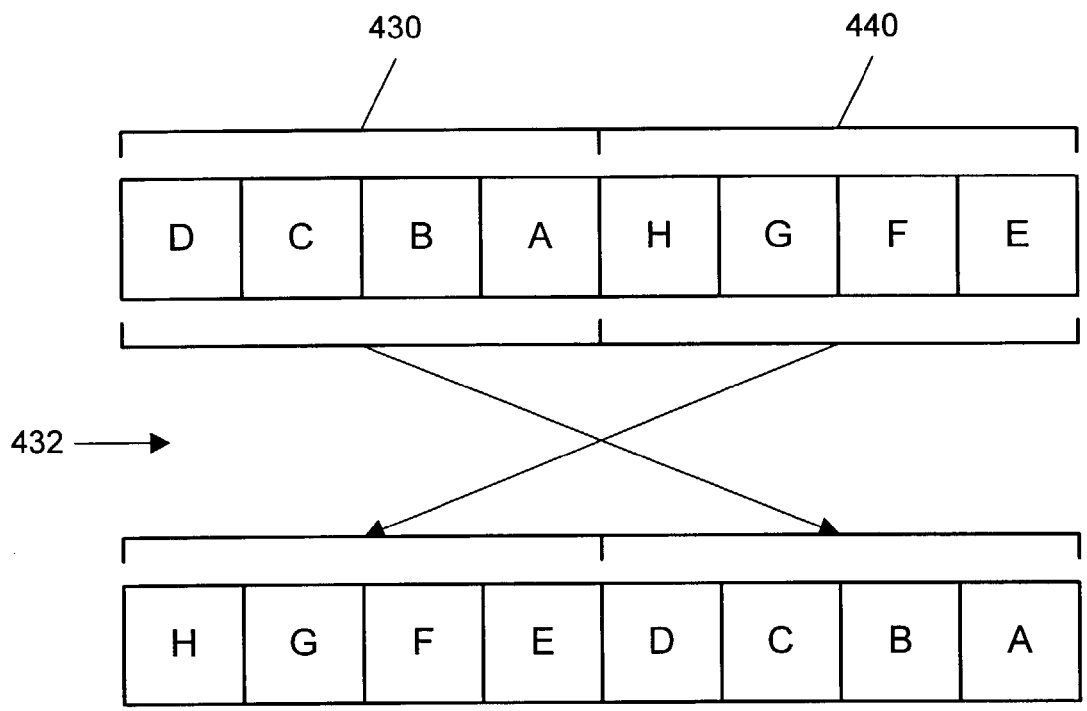
Figure 4D:
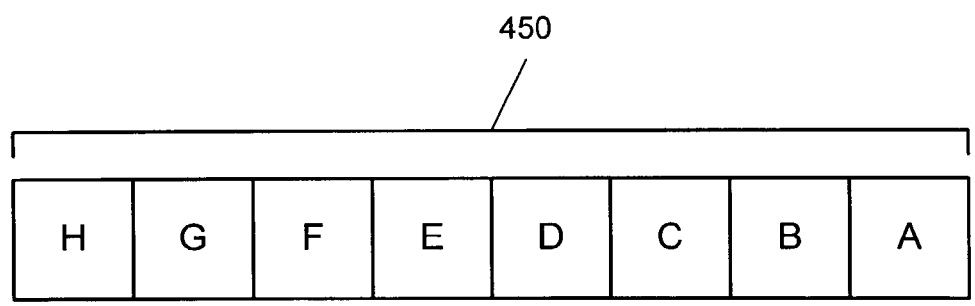

FIG. 4C illustrates a second portion of the byte swapping operation on the operand 400. The operand 400 has been transformed to include a first portion 430 comprising D, C, B, and A, and a second portion 440 comprising H, G, F, and E. A shifting or swap 432 is performed on the first 430 and second 440 portions such that the second portion 440 is moved ahead of the first portion 430. The resultant operand is a data segment 450 comprising bytes in an order of H, G, F, E, D, C, B, and A as illustrated in FIG. 4D.

Figure 5B:
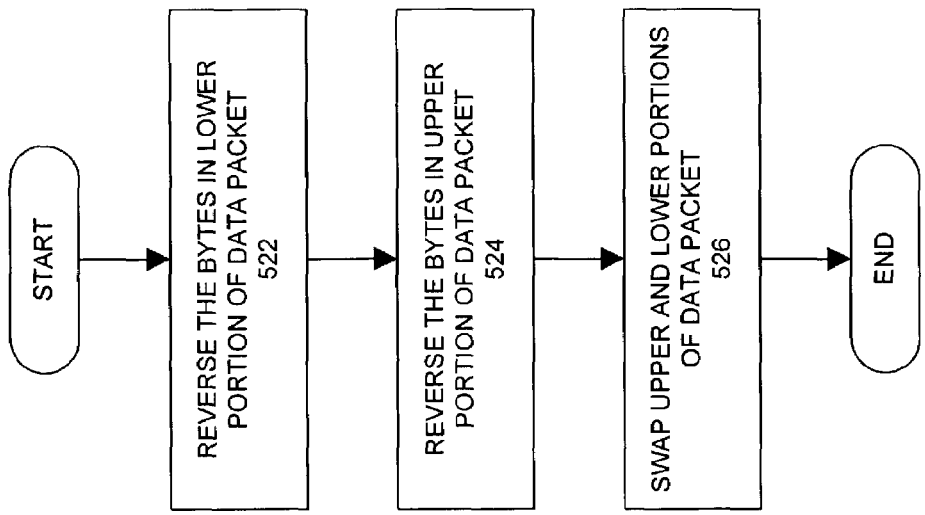
FIG. 5B is a flow chart illustrating another embodiment of a method to byte swap an operand.
Figure 5A:
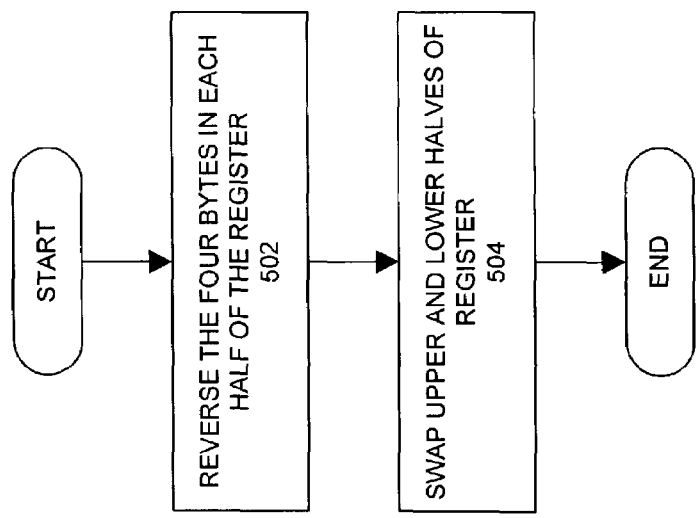
FIG. 5A is a flow chart illustrating one embodiment of a method to byte swap a 64 bit operand.

FIG. 5A is a flow chart illustrating one embodiment of a method to byte swap a 64 bit operand. For this example, a 64 bit wide operand is located in a register located in a processor. The 64 bit wide operand of this embodiment is comprised of 8 individual bytes, each byte having 8 bits. During this byte swap operation, the 64 bit operand is treated as two data segments, wherein each half of the operand comprises of four bytes. At block 502, the order of the four bytes in each half of the register is reversed. Thus bytes ordered as WXYZ are rotated to become ordered as ZYXW. The reversing of each half of the operand in this embodiment happen in parallel or simultaneously. The upper and lower halves of the register contents are swapped at block 504 such that the upper four bytes in the register are moved to the position of the lower four bytes while the four bytes in the lower portion of the register are moved to the upper four byte position. The resultant of this byte swap operation is a 64 bit operand of reversed order from that of the initial operand.

FIG. 5B is a flow chart illustrating another embodiment of a method to byte swap an operand. The byte swapping operation of this example is performed on a 64 bit wide data packet. However, the data packet is operated on as two 32 bit chunks. At block 522, the order of the bytes in the lower portion of the data packet is rotated such that the first byte of the lower portion is swapped with the fourth byte of the lower portion and the second byte of the lower portion is swapped with the third byte. At block 524, the order of the bytes in the upper portion of the data packet is rotated such that the first byte of the upper portion is swapped with the fourth byte of the upper portion and the second byte of the upper portion is swapped with the third byte. Although the rotation of the bytes in the upper portion and the lower portion are discussed separately as blocks 522 and 524 in this example, the reorder operations are actually occurring in parallel. In other words, the reorder of the upper portion can be taking place at one logic block approximately at the same time as the reorder of the lower portion at a second logic block. For example, the reorder operations of one embodiment can be described as occurring in parallel in the sense that the operations can happen during approximately the same clock cycles or proximate in time. Furthermore, in an alternative embodiment, the reorder operations may, but are not required, to occur simultaneously or contemporaneously. Similarly, another embodiment can implement the swapping operations in series wherein one of the 32 bit portions are swapped before the second portion. The 32 bit wide upper and lower portions of the data packet are swapped at block 526, wherein the upper four bytes are exchanged positions with the lower four bytes. The resultant of this byte swap operation is a 64 bit operand of reversed order from that of the initial operand.

In the example embodiments as discussed for FIGS. 3, 4A–D, and 5A–B, the 64 bit byte swap operations are describes as first performing 32 bit byte swaps in upper/lower portions and then performing a 32 bit swap of the upper/lower 32 bit portions. However, other embodiments of the present invention are not limited as such. For example, one embodiment of a 64 bit byte swap operation can be constructed to first perform a 32 bit swap of the upper and lower 32 bit portions of a 64 bit operand before performing byte swaps of the bytes in each of the 32 bit portions. Embodiments of methods in accordance to the present invention are not restricted to being performed in any particular order and can vary depending on the implementation.

Although the above examples describe the byte swap operations in the context of a execution units and logic circuits, other embodiments of the present invention can be accomplished by way of software. Such software can be stored within a memory in the system. Similarly, the code can be distributed via a network or by way of other computer readable media. For instance, a computer program may be distributed through a computer readable medium such as a floppy disk or a CD ROM, or even a transmission over the Internet. Thus, a machine-readable medium can include any mechanism for storing or transmitting information in a form readable by a machine (e.g., a computer). For example, a machine-readable medium can include a read only memory (ROM), random access memory (RAM), magnetic disk storage media, optical storage media, flash memory devices, and electrical, optical, acoustical or other forms of propagated signals (e.g., carrier waves, infrared signals, digital signals, etc.).

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method comprising:
   accessing an operand stored in a register, said operand comprising a plurality of bytes of data;
   reordering a first set of bytes located in an upper half of said register;
   reordering a second set of bytes located in a lower half of said register; and
   swapping said first set of bytes with said second set of bytes, wherein said first set of bytes is relocated to said lower half of said register and said second set of bytes is relocated to said upper half of said register.

2. The method of claim 1 wherein said reordering of said first set of bytes is performed in parallel with said reordering of said second set of bytes.

3. The method of claim 2 wherein said operand is comprised of 64 bits of data.

4. The method of claim 3 wherein said first set of bytes is comprised of an upper four bytes of data of said operand.

5. The method of claim 4 wherein said second set of bytes is comprised of a lower four bytes of data of said operand.

6. The method of claim 5 wherein said reordering of said first set of bytes is comprised reversing order of said upper four bytes.

7. The method of claim 6 wherein said reordering of said second set of bytes is comprised of reversing order of said lower four bytes.

8. An apparatus comprising:
   a decoder to decode a byte swap instruction;
   a scheduler to dispatch said byte swap instruction for execution; and
   an execution unit to execute said byte swap instruction, said byte swap instruction to cause said execution unit to:
   access an operand stored in a register, said operand to comprise of a plurality of bytes of data;
   reorder a first set of bytes located in an upper half of said register;
   reorder a second set of bytes located in a lower half of said register; and
   swap said first set of bytes with said second set of bytes, wherein said first set of bytes is relocated to said lower half of said register and said second set of bytes is relocated to said upper half of said register.

9. An apparatus comprising:
   a decoder to decode a byte swap instruction comprised of a plurality of micro-instructions (uops);
   a scheduler to dispatch said byte swap instruction for execution; and
   an execution unit to execute said byte swap instruction, said byte swap instruction to cause said execution unit to:
   access an operand stored in a register, said operand to comprise of a plurality of bytes of data;
   reorder a first set of bytes located in an upper half of said register;

reorder a second set of bytes located in a lower half of said register; and swap said first set of bytes with said second set of bytes, wherein said first set of bytes is relocated to said lower half of said register and said second set of bytes is relocated to said upper half of said register.

10. The apparatus of claim 9 wherein said apparatus is a processor having a 64 bit architecture.

11. The apparatus of claim 10 wherein said operand is comprised of 64 bits of data.

12. The apparatus of claim 11 wherein said execution unit is operable to reorder said first set of bytes and said second set of bytes in parallel.

13. The apparatus of claim 12 wherein said first set of bytes is comprised of an upper four bytes of data of said operand and said second set of bytes is comprised of a lower four bytes of data of said operand.

14. The apparatus of claim 13 wherein said reorder of said first set of bytes comprises reversing order of said upper four bytes and said reorder of said second set of bytes comprises reversing order of said lower four bytes.

15. A system comprising:
a memory to store data and instructions;
a processor coupled to said memory on a bus, said processor operable to perform a byte swap operation, said processor comprising:
a bus unit to receive an instruction from said memory;
a decoder to decode an instruction to perform a byte swap on an operand;
a scheduler to dispatch said decoded instruction for execution; and
an execution unit to execute said decoded instruction, said decoded instruction to cause said execution unit to:
access said operand stored in a register, said operand to comprise of a plurality of bytes of data;
reorder a first set of bytes located in an upper half of said operand;
reorder a second set of bytes located in a lower half of said operand; and
swap said first set of bytes with said second set of bytes, wherein said first set of bytes is relocated to a position at said lower half of said register and said second set of bytes is relocated to a position at said upper half of said register.

16. The system of claim 15 wherein said operand is stored in a register file of said processor.

17. The system of claim 16 wherein said processor is comprised of a 64 bit architecture.

18. The system of claim 17 wherein said operand is comprised of 64 bits of data.

19. The system of claim 18 wherein said first set of bytes is comprised of an upper four bytes of said operand and said second set of bytes is comprised of a lower four bytes of said operand.

20. The system of claim 19 wherein said processor further comprises a retirement unit, said retirement unit to retire said instruction after said instruction has executed correctly and to commit a result of said instruction to an architectural state.

21. The system of claim 20 wherein said result comprises bytes of said operand in reverse order.

22. A machine readable medium having embodied thereon a computer program, said computer program being executable by a machine to perform a method comprising:

accessing an operand stored in a register, said operand comprised of a plurality of bytes of data;

reordering a first set of bytes located in an upper half of said operand;

reordering a second set of bytes located in a lower half of said operand; and swapping said first set of bytes with said second set of bytes, wherein said first set of bytes is relocated to said lower half of said register and said second set of bytes is relocated to said upper half of said register.

23. The machine readable medium of claim 22 wherein said reordering of said first set of bytes is performed in parallel with said reordering of said second set of bytes.

24. The machine readable medium of claim 23 wherein said operand is comprised of 64 bits of data.

25. The machine readable medium of claim 24 wherein said first set of bytes is comprised of an upper four bytes of data of said operand and said second set of bytes is comprised of a lower four bytes of data of said operand.

26. The method of claim 25 wherein said reordering of said first set of bytes is comprised of reversing order of said upper four bytes and said reordering of said second set of bytes is comprised of reversing order of said lower four bytes.

27. An apparatus comprising:
a decoder to decode a byte swap instruction to generate a plurality of micro-instructions;
a scheduler to dispatch said plurality of micro-instructions for execution; and
an execution unit to execute said plurality of micro-instructions responsive to said byte swap instruction to cause said execution unit to:
access an operand stored in a register, said operand to comprise of a plurality of bytes of data;
reorder a first set of bytes located in a lower half of said register;
swap said first set of bytes with a second set of bytes located in an upper half of said register, wherein said first set of bytes is relocated to said upper half of said register and said second set of bytes is relocated to said lower half of said register; and
reorder said second set of bytes of said register responsive to a second micro-instructions of said plurality of micro-instructions.

28. The apparatus of claim 27 wherein reordering said first set of bytes of said register is responsive to a first micro-instructions of said plurality of micro-instructions.

29. The apparatus of claim 28 wherein reordering said second set of bytes is responsive to a second micro-instructions of said plurality of micro-instructions.

30. The apparatus of claim 29 wherein swapping said first set of bytes with said second set of bytes is responsive to said second micro-instructions of said plurality of micro-instructions.

31. The apparatus of claim 27 wherein said execution unit is operable to reorder said first set of bytes and said second set of bytes in parallel.

* * * * *